(12) United States Patent
Füchtling (10) Patent No.: US 12,464,981 B2
(45) Date of Patent: Nov. 11, 2025

(54) DRAPER WITH BELT GUIDING UNIT

(71) Applicant: CLAAS Selbstfahrende Erntemaschinen GmbH, Harsewinkel (DE)

(72) Inventor: Christian Füchtling, Rinkerode (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 909 days.

(21) Appl. No.: 17/698,589

(22) Filed: Mar. 18, 2022

(65) Prior Publication Data

US 2022/0304235 A1   Sep. 29, 2022

(30) Foreign Application Priority Data

Mar. 23, 2021 (DE) .......................... 102021107187.9

(51) Int. Cl.
*A01D 57/20* (2006.01)
*A01D 61/02* (2006.01)
*A01D 34/04* (2006.01)

(52) U.S. Cl.
CPC ............. *A01D 57/20* (2013.01); *A01D 61/02* (2013.01); *A01D 34/04* (2013.01)

(58) Field of Classification Search
CPC ........ A01D 57/20; A01D 61/02; A01D 34/04; A01D 61/002
See application file for complete search history.

(56) References Cited

U.S. PATENT DOCUMENTS 1,567,945 A * 12/1925 Hays .................... A01D 61/002
                                                                198/750.8
4,599,852 A *  7/1986 Kerber .................. A01D 41/14
                                                                   56/15.8
(Continued)

FOREIGN PATENT DOCUMENTS

DE   102011081400 A1 *  3/2012  ............. A01D 41/14
DE   102013100322 A1     7/2014
(Continued)

OTHER PUBLICATIONS

European Search Report for European application No. 21209448.6-1105 mailed May 9, 2022.

*Primary Examiner* — Arpad Fabian-Kovacs
(74) *Attorney, Agent, or Firm* — Lempia Summerfield Katz LLC (57) ABSTRACT

A draper for an agricultural machine. The draper includes a middle segment and two side segments, each with a frame, a flexible cutter bar, that is arranged or positioned on support arms pivotably articulated to the frame, as well as one or more continuously circulating conveyor devices arranged or positioned behind the cutter bar. The one or more conveyor device comprises a first guide roller that is arranged or positioned on the middle segment, and a second guide roller that is arranged or positioned at the end on the particular side segment around which the endless conveyor belt circulates. The two side segments are each pivotably connected to the middle segment by a frame joint about a pivot axis running substantially horizontally. The particular side segment has a belt guiding unit with a guide roller.

20 Claims, 9 Drawing Sheets

(56) References Cited

U.S. PATENT DOCUMENTS

| | | | | |
|---|---|---|---|---|
| 7,614,206 B2* | 11/2009 | Tippery | A01D 41/144 | 56/15.8 |
| 7,788,891 B2* | 9/2010 | Puryk | A01D 61/002 | 56/153 |
| 7,971,419 B2* | 7/2011 | Sauerwein | A01D 57/20 | 56/181 |
| 7,992,372 B1* | 8/2011 | Coers | A01D 41/14 | 56/153 |
| 8,051,633 B2* | 11/2011 | Figgins | A01D 41/141 | 56/181 |
| 8,087,224 B1* | 1/2012 | Coers | A01D 57/20 | 56/153 |
| 8,281,561 B2* | 10/2012 | Dow | A01D 61/002 | 56/181 |
| 8,495,855 B1* | 7/2013 | Conrad | A01D 61/002 | 56/181 |
| 8,601,779 B1* | 12/2013 | Figgins | A01D 34/283 | 56/181 |
| 9,144,199 B2* | 9/2015 | Ritter | A01D 41/14 | |
| 9,402,343 B1* | 8/2016 | Allochis | A01D 34/283 | |
| 9,622,409 B2* | 4/2017 | Coers | A01D 41/14 | |
| 10,264,728 B2 | 4/2019 | Brimeyer | | |
| 10,292,331 B2* | 5/2019 | Lauwers | A01D 61/002 | |
| 10,575,462 B2* | 3/2020 | Neely | A01D 34/33 | |
| 11,083,135 B2 | 8/2021 | Neitemeier et al. | | |
| 2007/0193243 A1* | 8/2007 | Schmidt | A01D 43/06 | 56/181 |
| 2007/0204589 A1* | 9/2007 | Coers | A01D 61/002 | 56/208 |
| 2008/0276590 A1* | 11/2008 | Sauerwein | A01D 41/14 | 56/153 |
| 2009/0266044 A1* | 10/2009 | Coers | A01D 57/20 | 56/208 |
| 2009/0293441 A1* | 12/2009 | Sauerwein | A01D 57/20 | 56/208 |
| 2009/0320431 A1* | 12/2009 | Puryk | A01D 41/14 | 56/181 |
| 2010/0083629 A1* | 4/2010 | Klotzbach | A01D 41/14 | 56/320.1 |
| 2013/0097986 A1* | 4/2013 | Lovett | A01D 41/14 | 56/153 |
| 2013/0105282 A1* | 5/2013 | Hoffman | B65G 23/44 | 198/814 |
| 2014/0041354 A1* | 2/2014 | Coon | A01D 41/06 | 56/158 |
| 2014/0150395 A1 | 6/2014 | Coers et al. | | |
| 2014/0196427 A1 | 7/2014 | Fuechtling | | |
| 2018/0206406 A1* | 7/2018 | Joyce | A01D 61/002 | |
| 2019/0000014 A1* | 1/2019 | Farley | A01D 61/002 | |
| 2019/0000015 A1 | 1/2019 | Lauwers et al. | | |
| 2019/0029176 A1* | 1/2019 | Yanke | A01D 41/14 | |
| 2021/0144922 A1 | 5/2021 | Farley et al. | | |

FOREIGN PATENT DOCUMENTS

| | | | | |
|---|---|---|---|---|
| EP | 2524590 B1 * | 6/2014 | | A01D 61/002 |
| EP | 2422606 B1 * | 9/2014 | | A01D 41/14 |
| EP | 2754346 B1 * | 9/2015 | | A01D 34/00 |
| EP | 3420796 B1 | 8/2020 | | |
| EP | 3469877 B1 * | 6/2021 | | A01D 34/04 |
| EP | 3821694 B1 * | 1/2025 | | A01D 41/06 |
| WO | 2019023238 A1 | 1/2019 | | |

* cited by examiner

DRAPER WITH BELT GUIDING UNIT

CROSS REFERENCE TO RELATED APPLICATION

This application claims priority under 35 U.S.C. § 119 to German Patent Application No. DE 102021107187.9 filed Mar. 23, 2021, the entire disclosure of which is hereby incorporated by reference herein.

TECHNICAL FIELD

The present invention relates to a draper.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

US Patent Application Publication No. 2014/0196427 A1, incorporated by reference herein in its entirety, discloses a draper.

EP 3 420 796 B1 discloses a draper that has a middle segment, wherein two side segments are each pivotably connected to the middle segment by a frame joint about a pivot axis running substantially horizontally and normal to the longitudinal axis of the draper, wherein the middle segment and the side segments have a segmented frame. A first guide roller is arranged on the middle segment, and a second guide roller, around which a conveyor belt continuously circulates, is arranged on the side segment diametrically opposite the first guide roller. To guide the belt in the bending point which is located in the region of the horizontal pivot axis, a third roller is arranged coaxial to the horizontal pivot axis.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein.

DETAILED DESCRIPTION

Drapers, such as disclosed in EP 3 420 796 B1, may pivot the lateral segments in a vertical direction about the horizontal pivot axis, which may increase flexibility while adapting the draper to changes in the soil contour, which allows for a greater working width for the draper. In the region of the bending points, depending on the direction of the pivoting movement of the side segment, deflections of the conveyor belt may occur, which may cause the conveyor belt to be lifted, which does not ensure sealing in the region of the lift. Moreover, the conveyor belt may become overloaded due to the deflection, which may result in increased wear.

In this regard, in one or some embodiments, a draper is disclosed that, as the working width increases, has the requisite flexibility when adapting the draper to changes in the soil contour, and thereby avoid the disadvantages of the prior art with respect to belt guidance.

In one or some embodiments, a draper of an agricultural machine is disclosed that includes: a middle segment; two side segments, at least one frame (e.g., each of the two side segments and the middle segment having a separate frame or each of the side elements and the middle segment being connected to different sections of a single frame); a cutter bar (e.g., a flexible cutter bar) that is arranged or positioned on support arms (such as pivotably articulated to the frame); and one or more conveyor devices arranged or positioned behind the cutter bar (relative to a forward direction of movement of the agricultural machine) that comprise continuously circulating conveyor belts that are borne or supported by support elements pivotably articulated to the frame in a plane running parallel to the support arms. One or each of the conveyor devices may comprise a first guide roller that is arranged or positioned on the middle segment, and a second guide roller that is arranged or positioned at the distal end on a respective side segment around which the endless conveyor belt circulates. Further, one or both of the two side segments may be pivotably connected to the middle segment by a frame joint about a pivot axis running substantially horizontally and normal to the longitudinal axis of the draper. In addition, the respective side segment may include a belt guiding unit with a guide roller that is rotatably positioned in the region of the frame joint about an axis parallel to the pivot axis, with the belt guiding unit being arranged or positioned on the frame about a pivot axis coaxial to the rotational axis of the support arms. Thus, in one or some embodiments, when there is a movement of one or both of the side segments towards the ground, the guide roller may adjust at least a part of the conveyor belt (e.g., adjust the guidance of the conveyor belt in the region of the bending point), thereby providing the requisite flexibility when adapting the draper to changes in the soil contour. This may allow for the conveyor belt to be able to pass the unsteady bending point region without losing guidance, or becoming damaged.

In one or some embodiments, a respective belt guiding unit may be connected to the cutter bar by its end facing away from the pivot axis. Connecting the belt guiding unit in the front area to the cutter bar may enable or allow for the floating compensation movements of the cutter bar arising from changes in the soil contour to be transferable to the belt guiding unit.

In one or some embodiments, the belt guiding unit may be arranged or positioned on the frame of the middle segment.

This may be advantageous when there is a downward vertical deflection of the side segment toward the ground so that the guidance of the conveyor belt is retained.

In one or some embodiments, at least one bottom belt guide element may be arranged or positioned on the support arms of the side segments adjacent to the frame, and extend below the conveyor belt, parallel to the longitudinal axis of the draper (e.g., below and parallel to the circulating conveyor belt). The at least one bottom belt guide element may reduce or prevent deflections of the support elements that move relative to the support arms from causing the conveyor belt to be lifted in a vertical direction. The at least one bottom belt guide element may further be fastened to the top side of the support arms.

In one or some embodiments, the at least one bottom belt guide element extends (such as substantially extends) over a region between the first guide roller and the second guide roller along the bottom side of the conveyor belt facing the support arms.

In one or some embodiments, the bottom belt guide element may comprise (or consist) of several individual segments that are sequentially arranged or positioned flush on the support arms substantially in the longitudinal direction of the draper. In particular, a bottom belt guide element, starting from a support arm adjacent to the bending point, may extend in the region of the bending point sectionally in the direction of the adjacent support arm between which the belt guiding unit is arranged or positioned.

Moreover, the belt guiding unit may comprise a first retainer and a second retainer, wherein the first and second retainers are arranged or positioned above the guide roller, facing the outside of the conveyor belt, and arranged or positioned so as to sectionally overlap it.

In one or some embodiments, the first retainer is configured to extend longitudinally starting from the axis of the guide roller, and extend sectionally in the direction of the middle segment above the conveyor belt. The longitudinal extension may be understood as an extension of the retainer running along the longitudinal axis of the draper.

In this case, the first and second retainers may comprise (or consist of) a substantially rigid material. The retainer(s) comprising (or consisting of) the rigid material may prevent the conveyor belt from lifting in the region of the bending point.

In one or some embodiments, at least one of the retainers (e.g., the second retainer) is configured to extend longitudinally, starting from the axis of the guide roller, and extending sectionally in the direction of the middle segment and the side segment above the conveyor belt.

In this case, the second retainer may comprise (or consist) of a substantially flexible material that is suitable to adapt to the arising contour under a deflection of the conveyor belt. Given the available flexibility of the retainer, a very soft transition may be generated which minimizes the wear to the conveyor belt in the region of the bending point.

In one or some embodiments, the belt guiding unit may be pivotably articulated to the frame via a bracket. An end of the roller may be rotatably mounted in the bracket. The bracket is arranged or positioned on the frame around the pivot axis coaxial to the rotational axis of the support arms. In this case, a frame-like retaining element may be arranged or positioned on the frame in a plane below the guide roller to which, or in which, the bracket is articulated that bears the belt guiding unit.

In one or some embodiments, an extension arm extending parallel to the guide roller and extending below the at least one bottom belt guide element may be arranged or positioned on the bracket. The at least one bottom belt guide element may adjoin the extension arm. The extension arm may be designed with at least one arm. In one or some embodiments, the extension arm is designed with two arms.

Moreover, on the free end of the extension arm, at least one bolt may be adjustable in height relative to the extension arm which adjoins a guide element arranged or positioned on the bottom side of the bottom belt guide element. The guide element extending substantially perpendicular to the bottom belt guide element may serve to limit the movement of the at least one bottom belt guide element in a vertical direction upon a deflection of the side section. In this way, an amount of deformation of the bottom belt guide element may be based on an adjustment of the at least one bolt within the slot.

The bolts on the free end of the extension arm may serve as a stop for the guide element. When the side segment swings toward the ground, the at least one guide element may force a specific deformation in the at least one bottom belt guide element in the region of the guide roller that follows the course of the bend of the conveyor belt. This may prevent the conveyor belt from detaching. The extent of deformation in the bending point area may be changed by the at least one height-adjustable bolt. In particular, the retainer may be fastened to the frame of the middle segment and/or the particular side segment.

Figure 1:
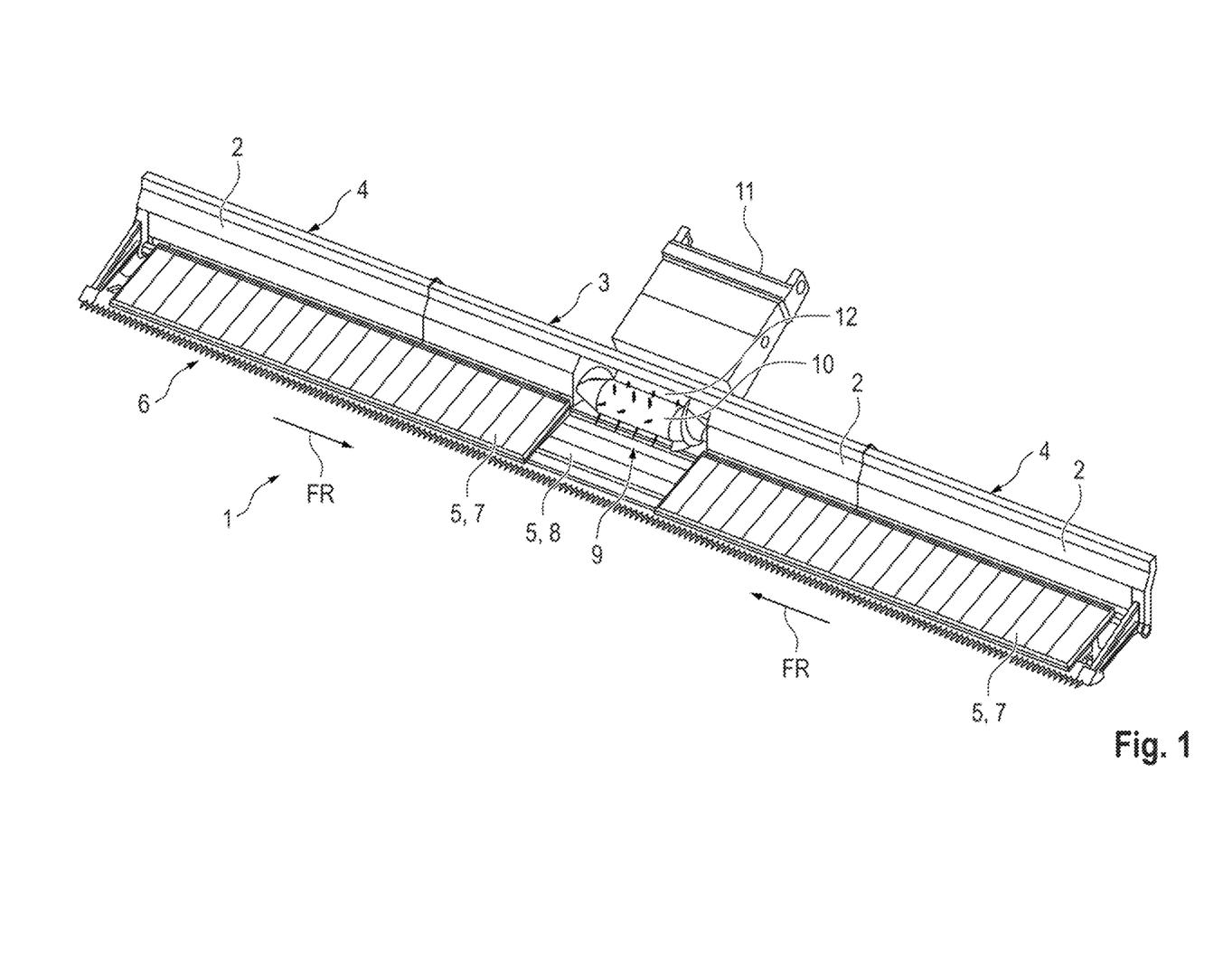
FIG. 1 illustrates a schematic view of a draper.

Referring to the figures, FIG. 1 shows a schematic representation of a draper 1. The draper 1 comprises a middle segment 3 and two side segments 4, each with a frame 2. In one or some embodiments, the frame 2 is designed as segmented, with different sections or parts, with various elements of the draper 1, such as the middle segment 3 and two side segments 4, being attached to the different sections or different parts. Alternatively, the frame 2 comprises a single section or parts with various elements of the draper 1 attached to the single section. In this regard, the draper 1 may include at least one frame, such as each of the two side segments 4 and the middle segment 3 having a separate frame or each of the side segments 4 and the middle segment 3 being connected to different sections of a single frame. Moreover, the draper 1 comprises a flexible cutter bar 6 that is positioned on support arms 17 pivotably articulated to at least a part of the frame 2 and extends substantially over the entire width of the draper 1 (e.g., over at least 85% of the entire width of the draper 1; over at least 90% of the entire width of the draper 1; over at least 95% of the entire width of the draper 1). Conveyor devices 5 are arranged or positioned behind the cutter bar 6 (relative to the direction of travel) that are designed as continuously circulating belts 7. In a plane running parallel to the support arms 17, support elements 18 are pivotably articulated to the frame 2 and bear the circulating belts 7 as shown for example in FIG. 4.

The particular conveyor device 7 comprises a first guide roller that is arranged or positioned on the middle segment 3, and a second guide roller that is arranged or positioned at the distal end on the particular side segment 4 diametrically opposite the first guide roller around which the conveyor belt 7 continuously circulates. The continuously circulating conveyor belts 7 extend sectionally up to the middle segment 3 in order to transport harvested material cut by the cutter bar 6 laterally toward the middle segment 3 which is illustrated by arrows FR, and to supply the harvested material to a feed device 9. The middle segment 3 also comprises a conveyor device 5 designed as at least one continuously circulating conveyor belt 8. The at least one conveyor belt 8 conveys perpendicular to the direction of conveyance FR of the conveyor belts 7 of the side segments 4. Other embodiments of the conveyor device 5 in the region of the middle segment 3 are conceivable. The feed device 9 is designed as a drivable feed roller 10. The feed device 9 supplies the harvested material laterally supplied by the continuously circulating conveyor belts 7 to the middle segment 3 toward an opening 12 provided in the frame 2 of the middle segment 3 and located behind the feed roller 10 through which the harvested material is supplied to the combine for further processing through a feed channel 11 located on a combine (not shown) to which the draper 1 is releasably attached. An example combine is disclosed in U.S. Pat. No. 11,083,135, incorporated by reference herein in its entirety.

Figure 2:
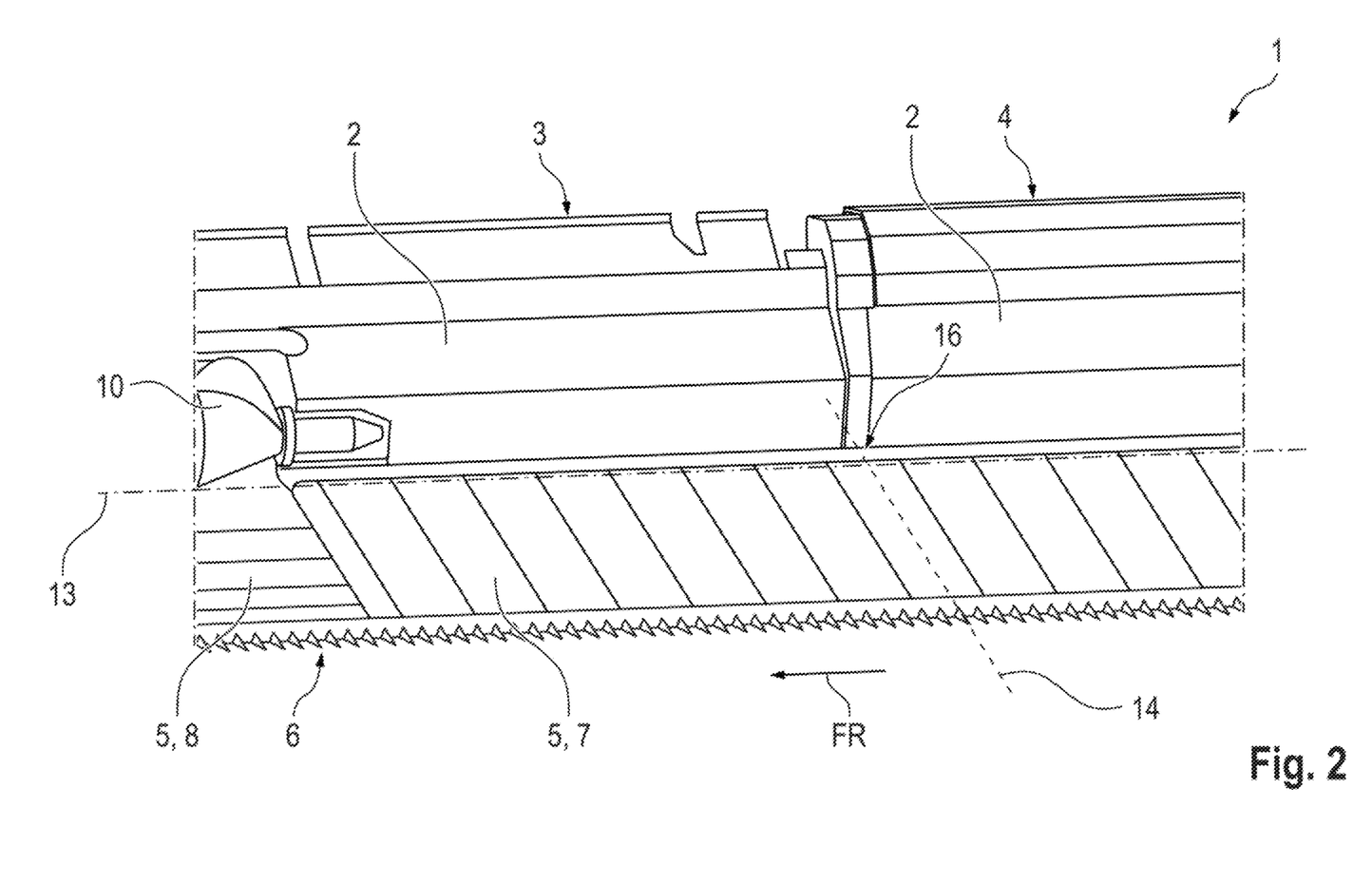
FIG. 2 illustrates a perspective partial view of the draper according to FIG. 1.
Figure 3:
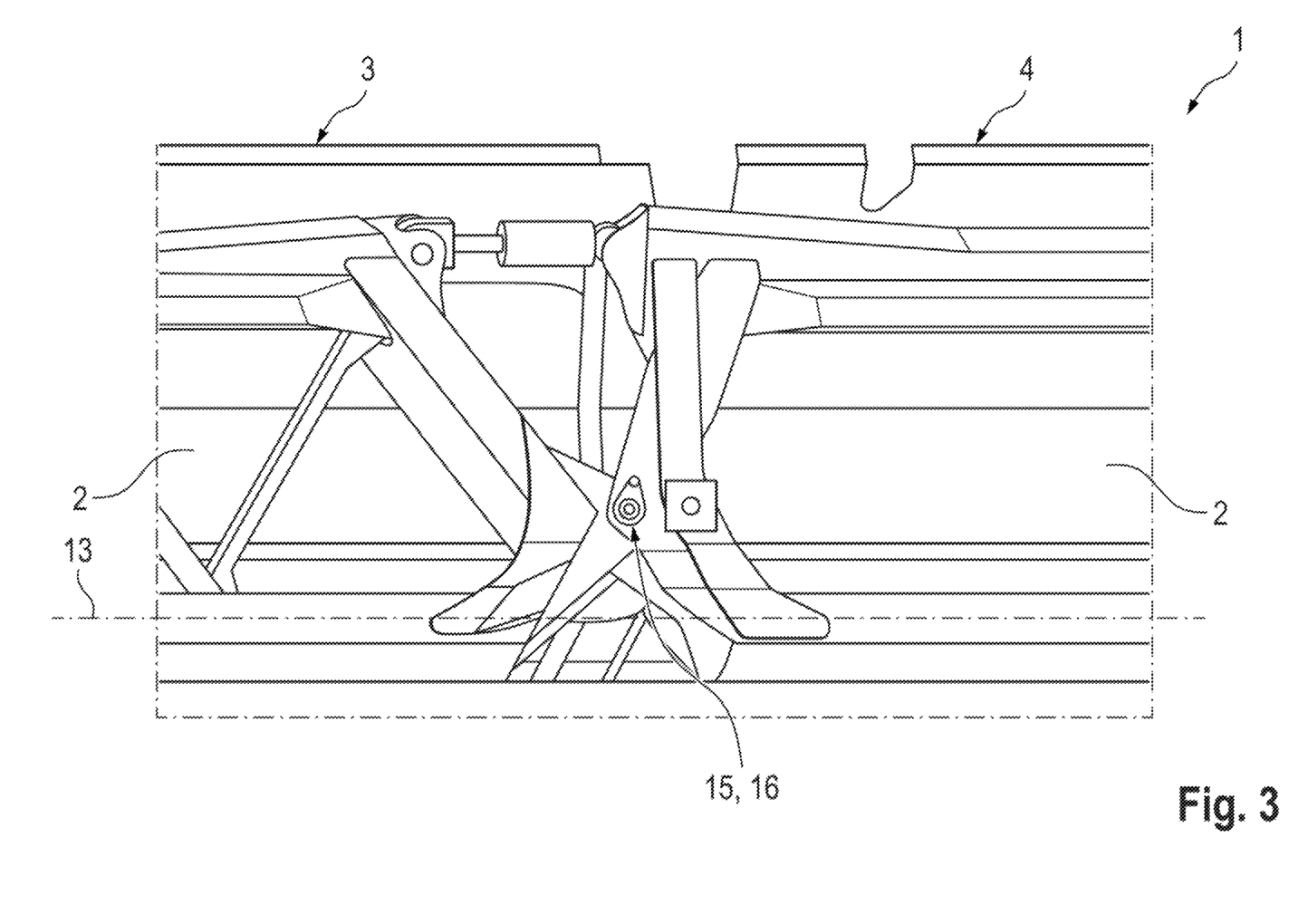
FIG. 3 illustrates a perspective partial view of the draper according to FIG. 2 from the rear.

FIG. 2 shows a perspective partial view of the draper 1 according to FIG. 1. FIG. 3 shows a view of the draper 1 according to FIG. 2 from the rear. The side segments 4 are each pivotably connected by a frame joint 15, as shown in FIG. 3, to the middle segment 3 about a pivot axis 14 running substantially horizontally (e.g., less than 10% from horizontal; less than 5% from horizontal; less than 2% from horizontal) and normal to the longitudinal axis 13 of the draper 1. The two side segments 4 are designed identical and are arranged or positioned mirrored opposite each other on the middle segment 3 by the frame joints 15. A bending point 16 of the belt 7 is formed in the region of the pivot axis 14 of the frame joint 15.

Figure 4:
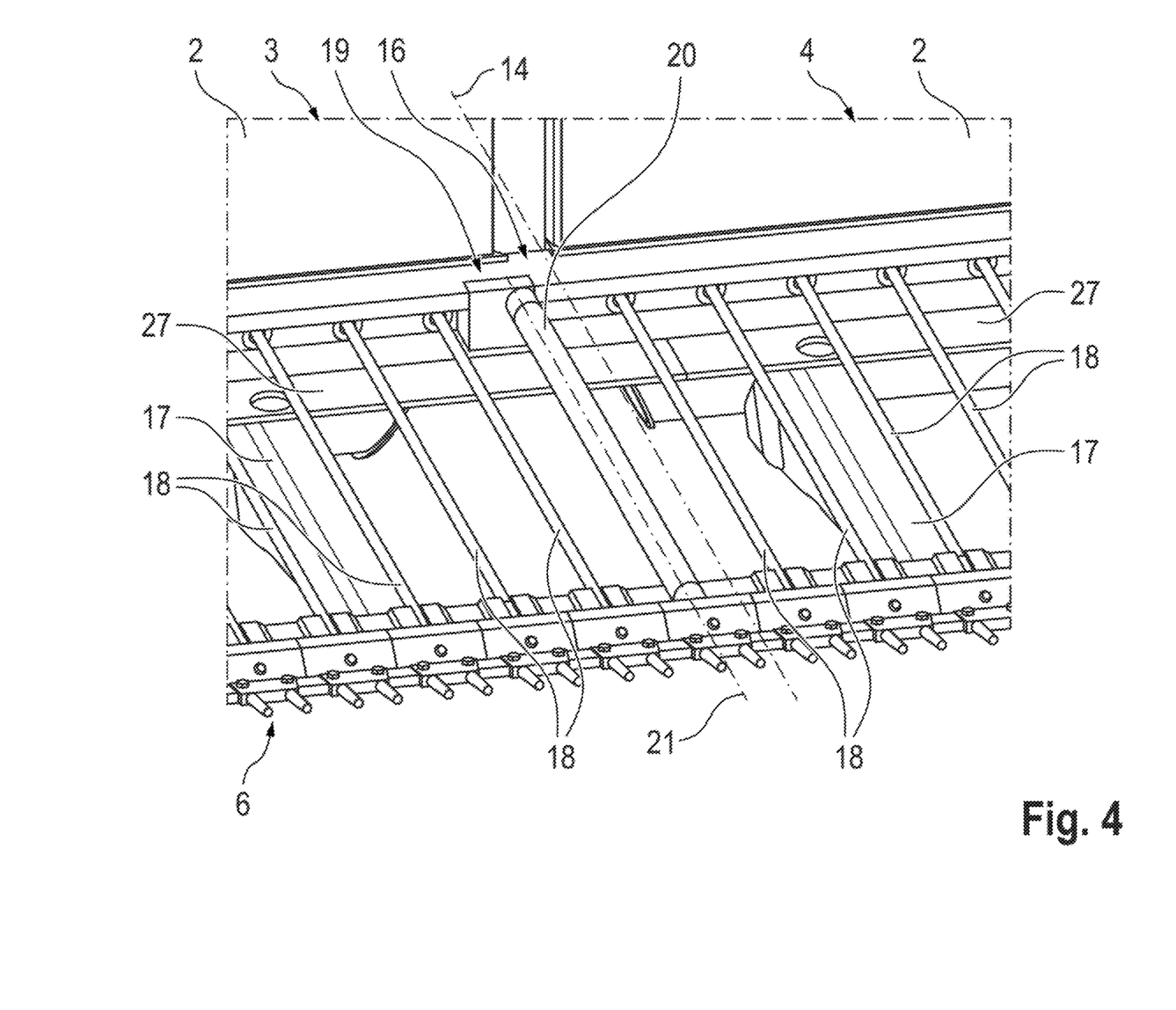
FIG. 4 illustrates a perspective partial view of a bending point of the draper.

FIG. 4 shows a perspective partial view of the bending point 16 between the middle segment 3 and one of the side segments 4 of the draper 1. To keep the conveyor belt 7 from being able to move away from the support elements 18 at this bending point 16 due to a pivoting movement of the side segment 4 which would form a gap, a belt guiding unit 19 is provided. The belt guiding unit 19 comprises a guide roller 20 that is rotatably positioned in the region of the frame joint 15 about an axis 21 parallel to pivot axis 14.

Figure 5:
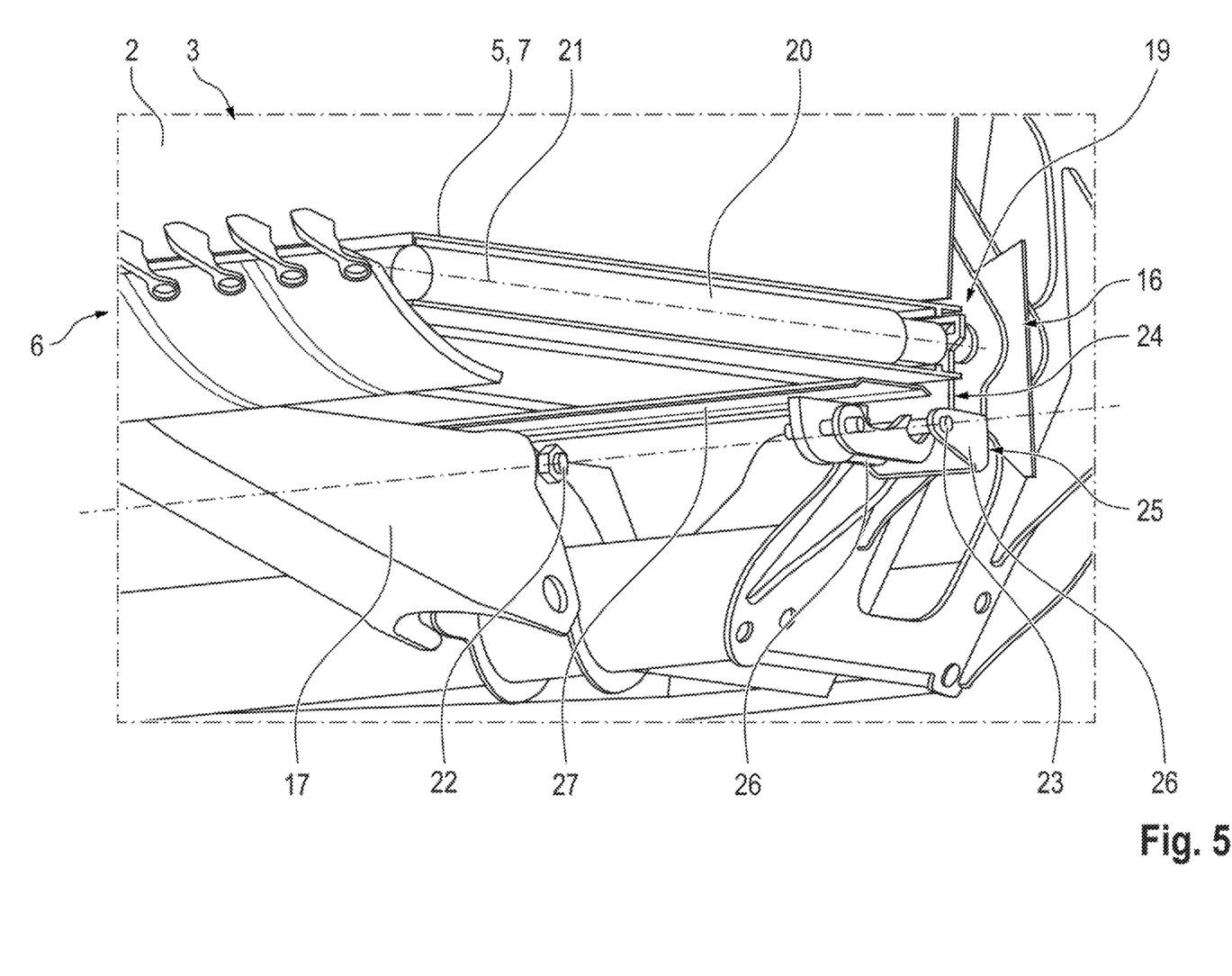
FIG. 5 illustrates a perspective partial view of a middle segment and the bending point according to FIG. 4.

FIG. 5 shows a perspective partial view of the middle segment 3 and the bending point 16 according to FIG. 4. The belt guiding unit 19 is arranged or positioned on the frame 2, in particular of the middle segment 3, about a pivot axis 23 coaxial to the rotational axis 22 of the support arms 17. For instance, when there is a movement of the particular side segment 4 towards the ground, the guide roller 20 takes over the guidance of the conveyor belt 7 in the region of the bending point 16. This makes it possible for the continuously circulating conveyor belt 7 to be able to pass the unsteady bending point area without losing guidance, or becoming damaged.

The belt guiding unit 19 is articulated or connected by a bracket 24 to the frame 2, such as frame 2 of the middle segment 3. To allow the belt guiding unit 19 to adapt to the movements of the flexible cutter bar 6, the belt guiding unit 19 is borne or supported in the rear region by the bracket 24 that may be pivoted about the pivot axis 23 running coaxial to the rotational axis 22 of the support arms 17 of the cutter bar 6. The bracket is connected by a retaining element 25. The substantially U-shaped retaining element 25 has two legs 26 between which the pivot axis 23 and the bracket 24 are arranged or positioned.

The particular belt guiding unit 19 is connected to the cutter bar 6 by its end facing away from the pivot axis 23. The connection of the belt guiding unit 19 at the front region to the cutter bar 6 allows the belt guiding unit 19 to adopt the floating deflection movements of the cutter bar 6 as a result of adapting to the particular ground contour.

Moreover, the depiction in FIG. 5 shows a bottom belt guide element 27. The bottom belt guide element 27 is arranged or positioned on the support arms 17 of the side segments 4 adjacent to the frame 2. The bottom belt guide element 27 extends below the continuously circulating belt 7 on the side of the support arms 17 facing the belt 7 and parallel thereto. The at least one bottom belt guide element 27 may extend substantially over a region between the first guide roller and the second guide roller of the conveyor device 5. In this case, the bottom belt guide element 27 may comprise (or consist) of a plurality of individual segments that are sequentially arranged or positioned flush on the support arms 17 substantially in the longitudinal direction. As illustrated in FIG. 4, a bottom belt guide element 27, starting from a support arm 17 of the middle segment 3 adjacent to the bending point 16, extends in the region of the bending point 16 sectionally in the direction of the adjacent support arm 17 at the side segment 4 between which the belt guiding unit 19 is arranged or positioned. The following bottom belt guide element 27 is relatively movable to the preceding bottom belt guide element 27.

Figure 6:
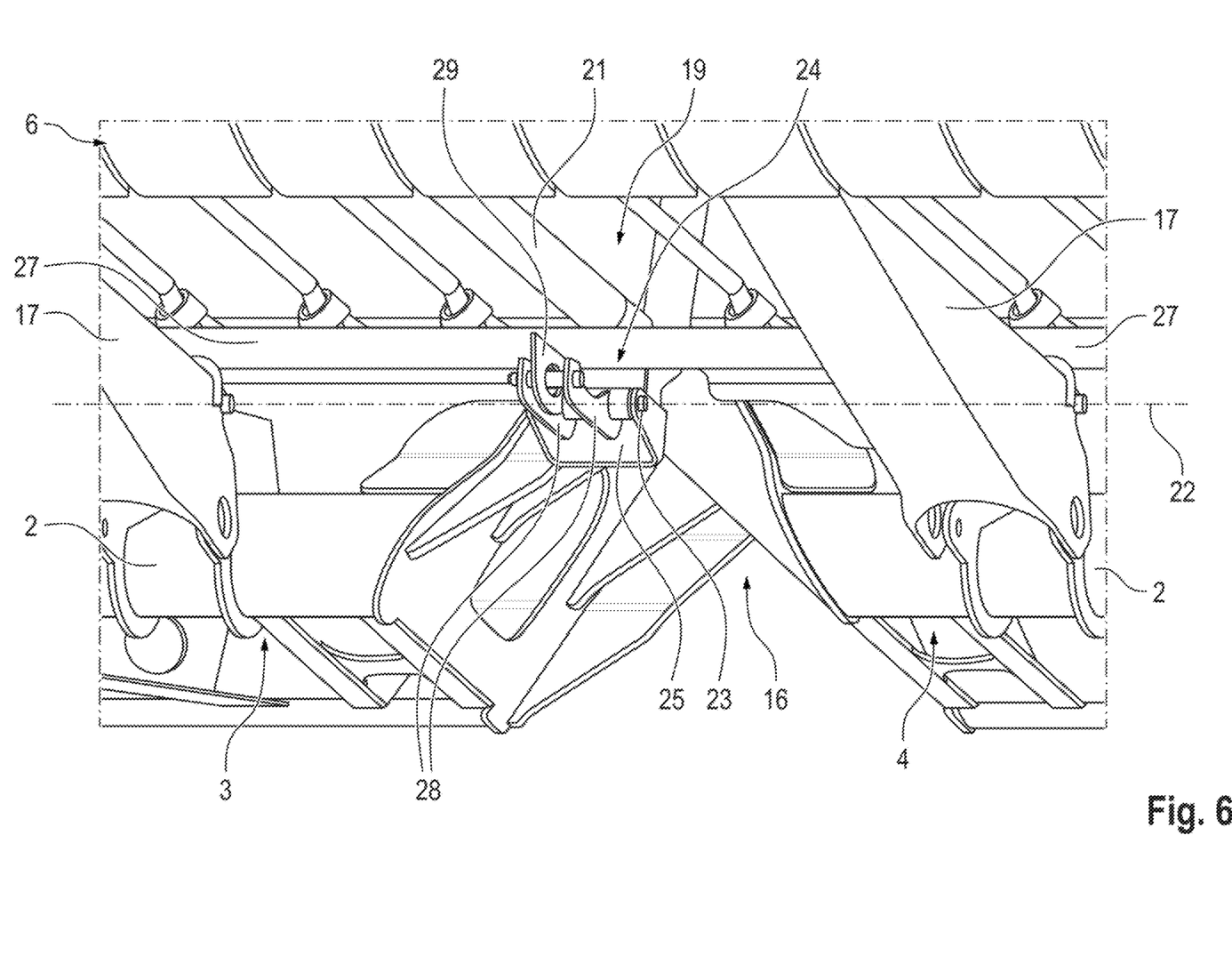
FIG. 6 illustrates a perspective partial view of the bending point between the middle segment and a side segment from below.

FIG. 6 shows a perspective partial view of the bending point 16 between the middle segment 3 and a side segment 4 from below. The retaining element 25 holding the bracket 24 is screwed to the frame 2. An extension arm 28 extending parallel to the guide roller 20 is arranged or positioned on the bracket 24 and extends at least to below the bottom belt guide element 27. The extension arm 28 may be designed as a single arm or, as shown in the exemplary embodiment, two arms. A guide element 29 is arranged or positioned on the free end of the extension arm 28 and is designed to be adjustable in height relative to the extension arm 28. The guide element 29 is fastened to the bottom side of the bottom belt guide element 27. The guide element 29 may serve to limit the movement of the at least one bottom belt guide element 27 in a vertical direction. When the side segment 4 swings toward the ground, the guide element 29 may cause a specific deformation in the bottom belt guiding element 27 in the middle segment 3 in the region of the guide roller 20 that follows the course of the bend of the conveyor belt 7. This may prevent the conveyor belt 7 from detaching.

Figure 7:
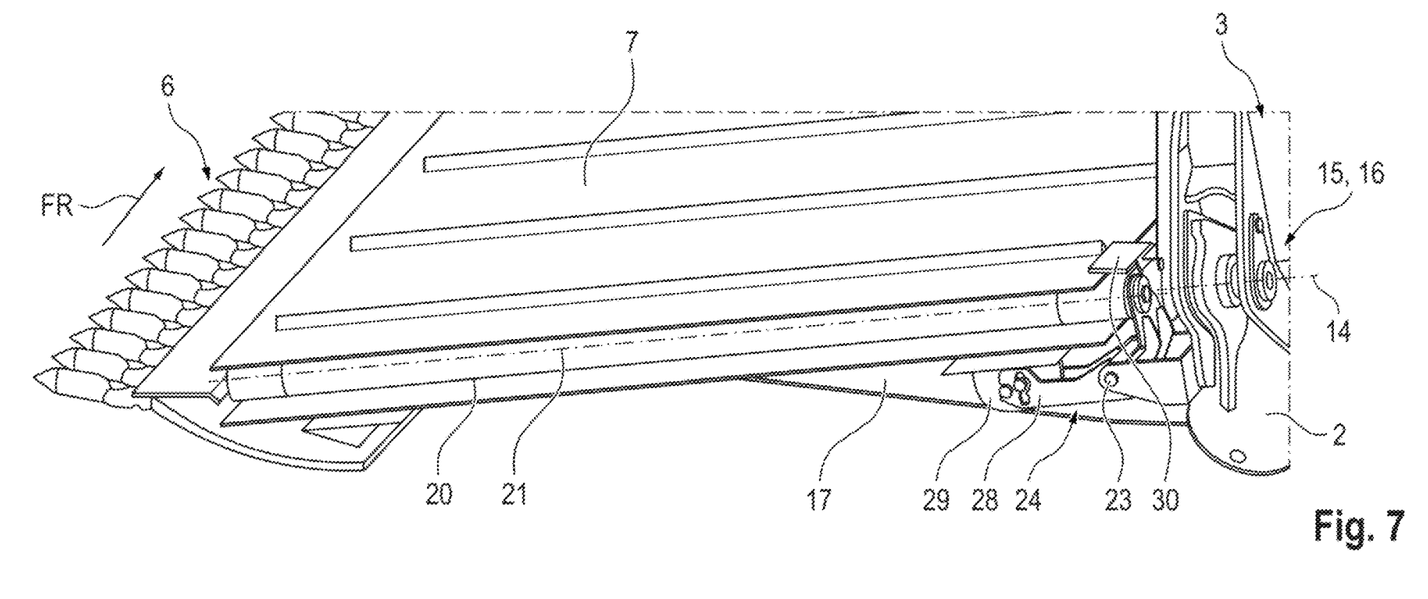
FIG. 7 illustrates a perspective partial view of the bending point in the middle segment obliquely from above.

FIG. 7 shows a perspective partial view of the bending point 16 in the middle segment 3 obliquely (or indirectly) from above. The belt guiding unit 19 comprises a retainer 30 arranged or positioned above the guide roller 20 and facing the outside of the circulating conveyor belt 7 and arranged or positioned so as to sectionally overlap it. The retainer 30 is arranged or positioned on the frame of the middle segment 3. The retainer 30 has a longitudinal extension with which the retainer 30, starting from the axis 21 of the guide roller 20, extends sectionally only in the direction of the middle segment 3 above the conveyor belt 7. The retainer 30 has the function of preventing the conveyor belt 7 from lifting upward when the side segment 4 pivots. With this short embodiment of the retainer 30, the conveyor belt 7 is only held down the region of the fixed frame 2 of the middle segment 3. To accomplish this, the retainer 30 is made of a rigid material.

Figure 8:
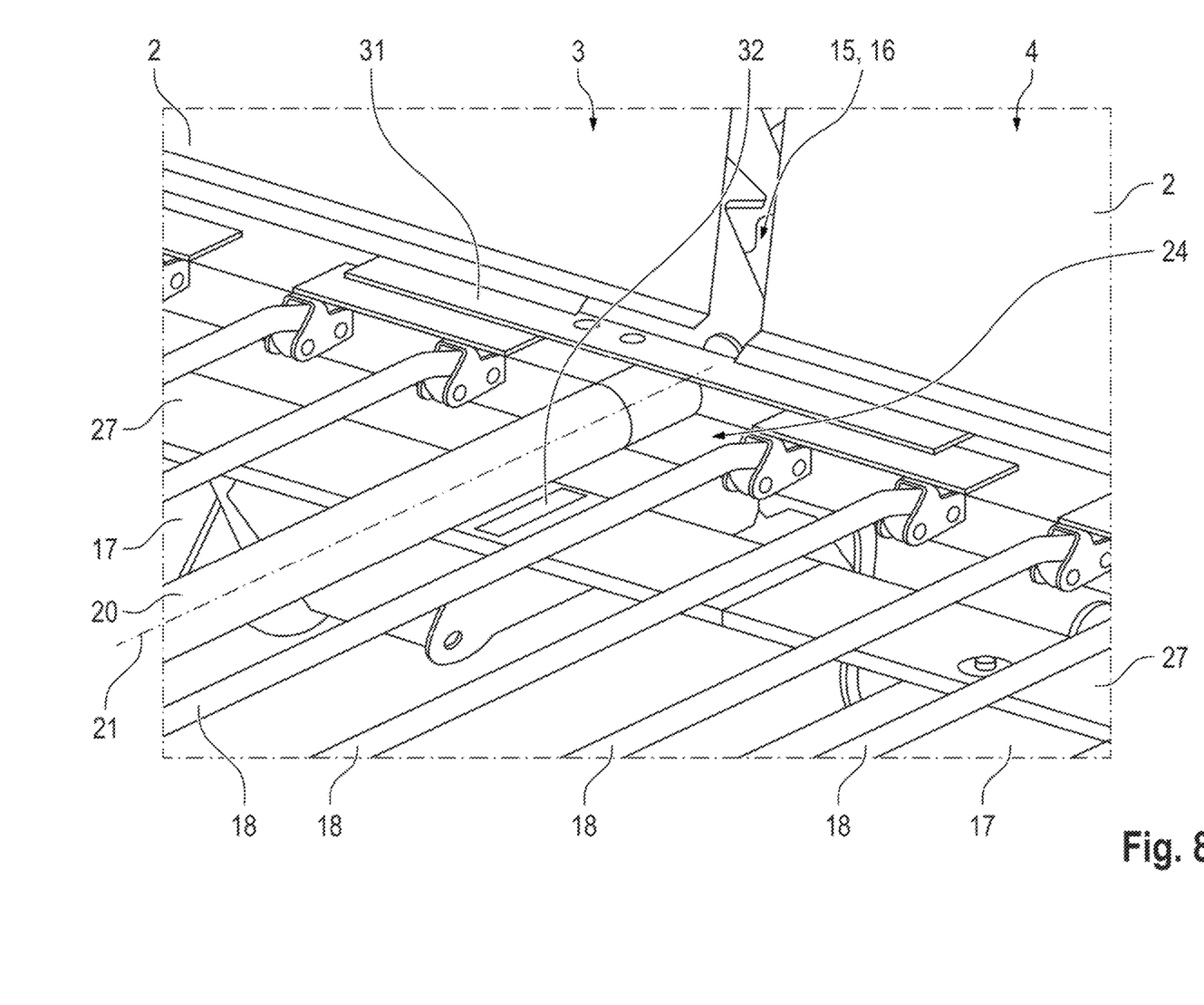
FIG. 8 illustrates a perspective partial view of the bending point in the middle segment obliquely from above with a retainer according to another embodiment.

FIG. 8 illustrates a perspective partial view of the bending point 16 between the middle segment 3 and the side segment 4 obliquely (or indirectly) from above with a retainer 31 according to another embodiment. The retainer 31 according to the second embodiment is designed to be long. The retainer 31 has a longitudinal extension with which the retainer 31, starting from the axis 21, extends sectionally in the direction of the middle segment 3 and the side segment 4 above the conveyor belt 7. In this embodiment, the retainer 31 may be fastened to the frame 2 of the middle segment 3 as well as of the side segment 4. In this case, the retainer 31 may preferably comprise (or consist) of a substantially flexible material that is suitable to adapt to the arising contour under a deflection of the conveyor belt 7. Given the available flexibility of the retainer 31, a very soft transition may result, which may reduce or minimize the wear to the conveyor belt 7. Moreover, the depiction in FIG. 8 shows a connecting region 32 of the guide element 29 arranged or positioned on the bottom of the at least one bottom belt guide element 27. The guide element 29 is arranged or positioned substantially vertically flush with the axis 21 of the guide roller 20.

Figure 9:
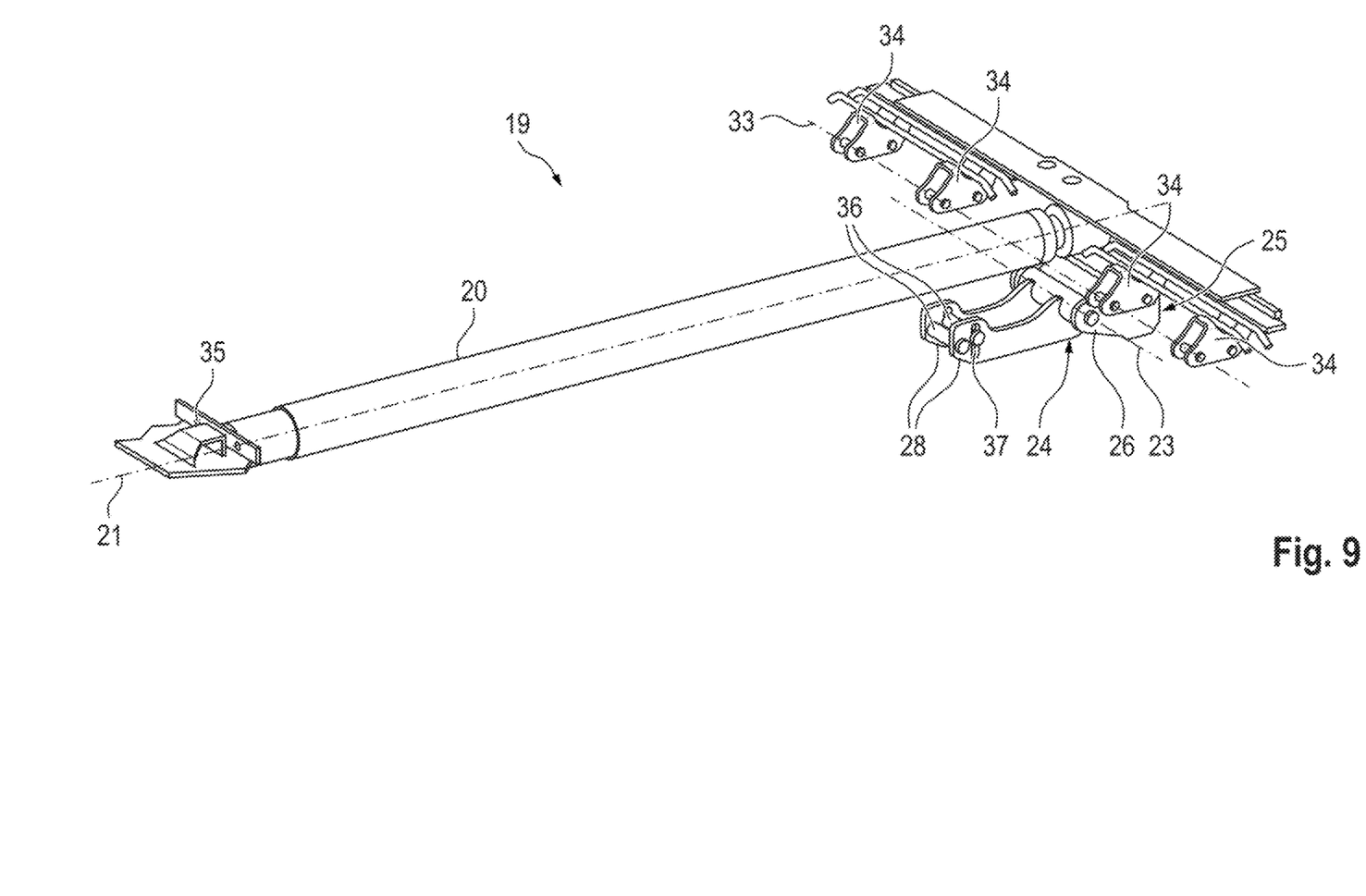
FIG. 9 illustrates a perspective view of a belt guiding unit.

FIG. 9 shows a perspective view of the belt guiding unit 19. Articulation points 34 of the support elements 18 may pivot about a separate pivot axis 33 independent of the support arms 17. On the front, free end of the guide roller 20 is a fastener 35 for fastening to the cutter bar 6. The two arm extension arm 28 has, on its free end, two axially parallel bolts 36 that extend between the arms of the extension arm 28. At least one bolt 36 is adjustable in height in a slot 37 in the free ends of the arms of the extension arm 28. In one or some embodiments, both bolts 36 are adjustable in height (e.g., placement of the bolt 36 in a first section of the slot 37 results in a first deformation of the bottom belt guide element 27; placement of the bolt 36 in a second section of the slot 37 results in a second deformation of the bottom belt guide element 27, with the first deformation being different from the second deformation). The two bolts 36 may form stop for the guide element 29 on the bottom side of the bottom belt guide element 27. The two adjustable bolts 36 as stops allow the movement of the bottom belt guide element 27 to be limited, which forces the bottom belt guide element 27 to specifically deform (e.g., the bolt(s) 36 may limit movement of the bottom belt guide element 27 thereby forcing the bottom belt guide element 27 to physically deform). The extent of deformation may be adjusted by the height adjustable bolts 36. In this regard, a means for configuring an amount of deformation of the bottom belt guide element 27 may comprise any one, any combination, or all of: one or more bolts 36 adjustable within one or more slots 37; and one or more guide elements 29. Specifically, the means for configuring an amount of deformation of the bottom belt guide element 27 may include may cause deformation of the bottom belt guide element 27 to at least partly follow bend of the conveyor belt 7, 8. Specifically, the amount of deformation of the means for configuring an amount of deformation of the bottom belt guide element 27 may comprise at least one adjustable mechanical means to adjust an amount of the deformation of the at least one bottom guide element (e.g., one or more bolts 36 adjustable within one or more slots 37). In this regard, the draper may include means for configuring deformation (such as means for configuring an amount of deformation by adjusting at least one mechanical aspect) of the bottom belt guide element 27.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

| List of Reference Numbers | |
|---|---|
| 1 | Draper |
| 2 | Frame |
| 3 | Middle segment |
| 4 | Side segment |
| 5 | Conveyor device |
| 6 | Cutter bar |
| 7 | Conveyor belt |
| 8 | Conveyor belt |
| 9 | Feed device |
| 10 | Feed roller |
| 11 | Feed channel |
| 12 | Opening |
| 13 | Longitudinal axis |
| 14 | Pivot axis |
| 15 | Frame joint |
| 16 | Bending point |
| 17 | Support arm |
| 18 | Support element |
| 34 | Articulation point |
| 35 | Fastener |
| 36 | Bolt |
| 37 | Slot |

19 Belt guiding unit
20 Guide roller
21 Axis
22 Rotational axis
23 Pivot axis
24 Bracket
25 Retaining element
26 Leg
27 Bottom belt guide element
28 Extension arm
29 Guide element
30 Retainer
31 Retainer
32 Connecting region
33 Pivot axis

The invention claimed is:

1. A draper comprising:
a middle segment;
two side segments;
at least one frame, the at least one frame comprising one or more sections with the middle segment and the two side segments connected to the at least one frame;
a cutter bar positioned on support arms pivotably connected to the at least one frame;
a plurality of conveyor devices positioned relative to the cutter bar comprising respective conveyor belts supported by respective support elements pivotably articulated to the at least one frame in a plane running parallel to the support arms; and
at least one bottom belt guide element;
wherein at least one conveyor device of the plurality of conveyor devices comprises a first guide roller that is positioned on the middle segment and a second guide roller that is positioned at an end of one of the two side segments around which the respective conveyor belt circulates;
wherein the one of the two side segments is pivotably connected to the middle segment by a respective frame joint about a pivot axis running substantially horizontally and normal to a longitudinal axis of the draper;
wherein the one of the two side segments includes a respective belt guiding unit with a respective guide roller that is rotatably positioned in a region of the respective frame joint about an axis parallel to the pivot axis with the respective belt guiding unit positioned on the at least one frame to which the middle segment is connected;

wherein the at least one bottom belt guide element is positioned on the support arms of one or both of the two side segments adjacent to the frame, and extending below the respective conveyor belt and parallel thereto; and wherein the respective belt guiding unit is positioned on the at least one frame about a pivot axis coaxial to a rotational axis of the support arms.

2. The draper of claim 1, wherein the cutter bar comprises a flexible cutter bar; and wherein the respective belt guiding unit is connected to the flexible cutter bar by its end facing away from the pivot axis.

3. The draper of claim 1, wherein the at least one bottom belt guide element comprises a plurality of individual segments that are sequentially positioned flush on the support arms substantially in a longitudinal direction;

wherein the at least one bottom belt guide element extends over a region between the first guide roller and the second guide roller; and wherein the bottom belt guide element comprises a plurality of individual segments that are sequentially positioned on the support arms longitudinally.

4. The draper of claim 1, wherein the respective belt guiding unit comprises at least one retainer;

wherein the at least one retainer is positioned above the guide roller and facing an outside of the one or more conveyor belts and positioned to sectionally overlap it; and wherein the at least one retainer is configured to prevent the respective conveyor belt from lifting upward response to a respective side segment pivoting.

5. The draper of claim 4, wherein the at least one retainer comprises a first retainer and a second retainer; and wherein the first retainer extends longitudinally from the axis of the guide roller, and extends sectionally in a direction of the middle segment above the one or more conveyor belts.

6. The draper of claim 4, wherein the at least one retainer comprises a first retainer and a second retainer;

wherein the second retainer extends longitudinally from the axis of the guide roller, and extends sectionally in a direction of the middle segment and a respective side segment above the one or more conveyor belts; and wherein the second retainer comprises a flexible material.

7. The draper of claim 4, wherein the at least one retainer comprises a first retainer and a second retainer; and wherein the first retainer extends longitudinally from the axis of the guide roller, and extends sectionally in a direction of the middle segment above the one or more conveyor belts;

wherein the first retainer comprises a rigid material;

wherein the second retainer extends longitudinally from the axis of the guide roller, and extends sectionally in the direction of the middle segment and a respective side segment above a respective conveyor belt; and wherein in the second retainer comprises a flexible material.

8. The draper of claim 1, wherein the respective belt guiding unit is articulated by and supported in a rear region by a bracket to the frame; and wherein the bracket is configured to pivot about the pivot axis coaxial to the rotation axis of the support arms.

9. The draper of claim 8, further comprising an extension arm, extending parallel to the guide roller, being positioned on the bracket and extending to below the at least one bottom belt guide element;

further comprising at least one bolt affixed within a slot;

wherein the at least one bolt is positioned on a respective free end of the extension arm;

wherein the at least one bolt is adjustable within the slot so that the free end of the extension arm is adjustable; and wherein the at least one bolt is configured to form a stop to at least a part of the bottom belt guide element.

10. The draper of claim 9, wherein the slot comprises a first section and a second section;

wherein the at least one bolt is configured to limit movement of the bottom belt guide element thereby forcing the bottom belt guide element to physically deform;

wherein the at least one bolt positioned in the first section of the slot results in a first deformation of the bottom belt guide element;

wherein the at least one bolt positioned in the first section of the slot results in a second deformation of the bottom belt guide element; and wherein the first deformation is different from the second deformation.

11. The draper of claim 1, further comprising:

at least one bottom belt guide element positioned on the support arms of the side segments adjacent to the frame, and extending below the one or more conveyor belts; and means for configuring an amount of deformation of the at least one bottom belt guide element, wherein the means for configuring an amount of deformation of the at least one bottom belt guide element is configured to cause deformation of the at least one bottom belt guide element to at least partly follow bend of the one or more conveyor belts.

12. The draper of claim 11, wherein the means for configuring an amount of deformation of the at least one bottom belt guide element comprises at least one adjustable mechanical means to adjust an amount of the deformation of the at least one bottom belt guide element.

13. The draper of claim 12, wherein the means for configuring an amount of deformation of the at least one bottom belt guide element comprises:

at least one adjustable bolt adjustable within a slot acting as the at least one adjustable mechanical means to adjust an amount of the deformation of the at least one bottom belt guide element and configured to act as a stop for at least one guide element;

wherein the at least one guide element is configured to deform the at least one bottom belt guide element to at least partly follow bend of the one or more conveyor belts;

wherein each of the plurality of conveyor devices comprises the first guide roller that is positioned on the middle segment and the second guide roller that is positioned at the end on a respective one of the two side segments around which a respective conveyor belt circulates;

wherein each of the two side segments is pivotably connected to the middle segment by the frame joint about the pivot axis running substantially horizontally and normal to the longitudinal axis of the draper;

wherein each of the two side segments includes a respective belt guiding unit with the guide roller that is rotatably positioned in the region of the frame joint about the axis parallel to the pivot axis; and wherein each respective belt guiding unit is positioned on the at least one frame about the pivot axis coaxial to the rotational axis of the support arms.

14. The draper of claim 1, wherein the two side segments are identical and positioned mirrored opposite each other on the middle segment by respective frame joints;

wherein a respective bending point of the respective conveyor belt is formed in the region of the respective frame joint; and wherein, responsive to movement of a respective side segment toward ground, the respective guide roller of the belt guiding unit takes over guidance of the respective conveyor belt at the respective bending point.

15. The draper of claim 8, wherein the bracket is connected to the respective belt guiding unit by a retaining element;

wherein the retaining element comprises two legs between which the bracket and the pivot axis coaxial to the rotation axis of the support arms are positioned; and further comprising an extension arm extending parallel to the guide roller of the belt guiding unit, positioned on the bracket, and extending at least to below the bottom belt guide element.

16. The draper of claim 15, further comprising an additional guide element positioned on a free end of the extension arm and configured to be adjustable in height relative to the extension arm; and wherein the additional guide element is fastened to a bottom side of the bottom belt guide element in order to limit movement of the bottom belt guide element.

17. The draper of claim 16, wherein, responsive to a respective side segment swinging toward ground, the additional guide element is configured to cause deformation in the bottom belt guide element in the middle segment in the region of the guide roller.

18. The draper of claim 17, wherein the additional guide element is positioned substantially vertically flush with the guide roller.

19. The draper of claim 1, wherein the respective belt guiding unit is connected to the cutter bar by its end facing away from the pivot axis coaxial to the rotation axis of the support arms.

20. The draper of claim 1, wherein articulation points of the support elements are configured to pivot about a separate pivot axis independent of the support arms.

* * * * *